United States Patent [19]

Dieterich

[11] 4,276,044
[45] Jun. 30, 1981

[54] WATER-SOLUBLE, ULTRA-FILTRABLE POLYURETHANE ANIONOMERS AND THE USE THEREOF AS SIZES IN THE TEXTILE INDUSTRY

[75] Inventor: Dieter Dieterich, Leverkusen, Fed. Rep. of Germany

[73] Assignee: Bayer Aktiengesellschaft, Leverkusen, Fed. Rep. of Germany

[21] Appl. No.: 89,682

[22] Filed: Oct. 30, 1979

[30] Foreign Application Priority Data

Nov. 8, 1978 [DE] Fed. Rep. of Germany ....... 2848431

[51] Int. Cl.³ ............... D06L 1/12; C08G 18/50; C08G 18/82; C08J 3/06
[52] U.S. Cl. ........................ 8/115.5; 260/29.2 TN; 260/2.3; 528/71; 528/230; 528/904; 528/905
[58] Field of Search .............. 528/71; 260/29.2 TN; 8/115.5

[56] References Cited

U.S. PATENT DOCUMENTS

| | | | |
|---|---|---|---|
| 3,061,470 | 10/1962 | Kuemmerer | 117/138.8 |
| 3,412,054 | 11/1968 | Milligan et al. | 260/18 |
| 3,879,450 | 4/1975 | Velker et al. | 260/513 R |
| 4,048,001 | 9/1977 | Remley | 260/29.2 TN |
| 4,068,035 | 1/1978 | Violland et al. | 428/279 |
| 4,096,127 | 6/1978 | Schurmann et al. | 260/29.2 TN |
| 4,108,814 | 8/1978 | Reiff et al. | 260/29.2 TN |
| 4,110,284 | 8/1978 | Violland et al. | 260/29.2 TN |
| 4,163,094 | 7/1979 | Turpin | 528/45 |

FOREIGN PATENT DOCUMENTS 2376168  7/1978  France .

OTHER PUBLICATIONS

Hackh's Chemical Dictionary, 3rd Ed., McGraw-Hill, N.Y., 1944, p. 878.

*Primary Examiner*—H. S. Cockeram
*Attorney, Agent, or Firm*—Gene Harsh; Lawrence S. Pope; Thomas W. Roy

[57] ABSTRACT

There is described a polyurethane anionomer which is particularly suitable as a textile sizing agent because it is water-soluble and sufficiently hydrolysis-resistant to be recoverable by ultra-filtration. It is superior to previously known ionomers in being hard, tough and having a smooth surface.

This anionomer is produced by reacting organic diisocyanates with tri- or tetra-ethylene glycol and optionally other aliphatic glycols as well as glycols bearing carboxyl, carboxylate, sulphonic acid or sulphonate groups in selected ratios which render the anionomer water-soluble after neutralization of an appropriate amount of the carboxyl or sulphonic acid groups. Aqueous solutions can be formed by dissolving the solid anionomer in water and these solutions can be used to size textile fibers with the recovery of excess anionomer by ulra-filtration.

8 Claims, No Drawings

WATER-SOLUBLE, ULTRA-FILTRABLE POLYURETHANE ANIONOMERS AND THE USE THEREOF AS SIZES IN THE TEXTILE INDUSTRY

FIELD OF THE INVENTION

This invention relates to new water-soluble, ultra-filtrable and extremely hard polyurethane anionomers and to the use thereof as regenerable sizes in the textile industry.

BACKGROUND OF THE INVENTION

Aqueous solutions of polyurethanes or polyurethane ureas have long been known (cf., for example, Angewandte Chemie, 82 (1970), pages 53 to 55, literature references 4–8, 10a).

The hydrophilic centers incorporated in the known water-soluble polyurethanes or polyurethane ureas may be formed both by salt-like groups, i.e. ionic groups, and also hydrophilic non-ionic groups. The "polyurethane ionomers" include both polyurethanes containing chemically fixed cations, i.e., in particular, chemically incorporated ammonium ions, and also polyurethanes containing chemically fixed anions, i.e., in particular, chemically incorporated sulphonate or carboxylate groups. The non-ionic water-soluble polyurethanes include, in particular, the polyurethanes or polyurethane ureas containing polyethylene oxide chains.

The hitherto known water-soluble polyurethane ionomers are either polyelectrolytes having an ionic group content of greater than 100 milliequivalents per 100 g and extreme hardness, although they are brittle, often hygroscopic and expensive to produce, or more or less elastomeric highly flexible polyurethanes synthesized in the conventional manner from polyesters and/or polyethers. These particular products are soluble in water by virtue of containing polyethylene glycol ether sequences, optionally in combination with ionic groups.

Polyesters containing ionic groups also impart solubility in water to the polyurethanes produced from them. On account of the brittleness thereof when dry and the surface tackiness thereof when moist, the highly ionic products are unsuitable for use as sizes in the textile industry. Products having relatively long polyether sequences are too soft and not smooth enough in feel. Furthermore, although ionic polyester urethanes may be produced having the desired range of mechanical properties, they show a tendency towards hydrolytic degradation in aqueous medium and, for this reason, cannot be regenerated by ultra-filtration. However, regeneratability from the effluents accumulating during desizing is an increasing requirement.

Accordingly, an object of the present invention is to provide water-soluble polyurethane anionomers which are no longer attended by the disadvantages referred to above and which, accordingly, satisfy all the requirements imposed on sizes for the textile industry.

SUMMARY OF THE INVENTION

According to the present invention, this object is achieved by the polyurethane anionomers according to the present invention described in detail hereinafter. They are hard, have a smooth surface, are not brittle, show toughness, are readily soluble in water, do not hydrolyze and, hence, may be effectively dialyzed and ultra-filtered. From 10 to 20% aqueous solutions show low viscosity.

The present invention relates to water-soluble, ultra-filtrable polyurethane anionomers essentially produced by reacting:

(a) organic diisocyanates having molecular weights of from about 160 to 300; with (b) tri- and/or tetra-ethylene glycol;

(c) optionally other aliphatic glycols having molecular weights of from about 62 to 200; in the presence of (d) glycols containing carboxyl, carboxylate, sulphonic acid and/or sulphonate groups and having a molecular weight of less than about 500;

in an NCO/OH-equivalent ratio of less than about 1:1, any carboxyl or sulphonic acid groups present having been at least partly converted into carboxylate or sulphonate groups after the reaction, characterized by a content of:

(e) urethane groups (—NH—CO—O—) of from about 25 to 40% by weight;

(f) hydroxyl groups of from about 0.03 to 1.5% by weight;

(g) carboxylate groups (—COO$^-$) and/or sulphonate groups (—SO$_3^-$) of from about 10 to 80 milliequivalents per 100 g; and (h) tri- and/or tetra-ethylene glycol units (—(O—CH$_2$CH$_2$)$_{3-4}$) incorporated either between two urethane groups or between one urethane group and hydrogen of from about 10 to 40% by weight.

The present invention also relates to the use of these polyurethane anionomers as sizes in the textile industry.

DETAILED DESCRIPTION OF THE INVENTION

Starting materials for producing the polyurethane anionomers according to the present invention are:

(a) organic diisocyanates having molecular weights of from about 160 to 300, preferably from about 174 to 250. It is preferred to use aromatic diisocyanates, particularly 2,4-diisocyanatotoluene, 2,6-diisocyanatotoluene, 4,4'-diisocyanatodiphenyl methane, 2,4'-diisocyanatodiphenyl methane and mixtures thereof. Aliphatic diisocyanates, such as hexamethylene diisocyanate are also suitable, although less preferred. Monoisocyanates, such as phenyl isocyanate, may also be used in small quantities of at most about 5 mol %, based on the total isocyanate component.

(b) Triethylene glycol or tetraethylene glycol or technical mixtures of these glycols.

(c) Other low molecular weight glycols having molecular weights of from about 62 to 200, such as ethylene glycol, diethylene glycol, 1,2-propylene glycol, dipropylene glycol, 1,3-dihydroxy propane, 1,4-dihydroxy butane, neopentylglycol, 1,5-dihydroxy pentane or 1,6-dihydroxy hexane. Although it is not absolutely essential to use these glycols in the production of the polyaddition products according to the present invention, the use thereof does afford advantages, particularly where diisocyanatotoluene or aliphatic diisocyanates are used in combination with tetraethylene glycol.

(d) Glycols having a molecular weight below about 500 and containing free carboxyl, carboxylate, sulphonic acid or sulphonate groups, of the type described, for example, in U.S. Pat. No. 3,412,054, incorporated herein by reference, German Offenlegungsschrift No. 2,417,664 (British Pat. No. 1,447,612), German Offenlegungsschrift No. 2,410,862 (U.S. Pat. No. 4,048,221 incorporated herein by reference), German Offenlegungsschrift No. 2,426,401 (British Pat. No. 1,455,554), German Offenlegungsschrift No. 2,437,218

(U.S. Pat. No. 4,056,564 incorporated herein by reference) or in German Patent Application No. P 27 19 372.2. It is preferred to use α,α-dimethylol propionic acid, α,α-dimethylol butyric acid or salts thereof, particularly alkali metal salts and, with particular preference, sodium salts, and also the salts, particularly the alkali metal salts and, with particular preference, sodium salts, of 1,4-dihydroxy-2-butane sulphonic acid or 3,4-dihydroxy-1-butane sulphonic acid or the alkoxylation products thereof having molecular weights below about 500. The synthesis components containing sulphonate groups are particularly preferred.

In addition to the synthesis components containing hydroxyl groups mentioned in (b) to (d), monohydric alcohols, such as ethanol, isopropanol or n-octanol, and/or higher alcohols, such as trimethylol propane or glycerol, may also be used in the production of the polyaddition products according to the present invention in quantities of at most about 5 mol %, based on the total quantity of components (b) to (d).

In cases where synthesis components (d) containing carboxyl or sulphonic acid groups are used, the acid groups are at least partly converted into carboxylate or sulphonate groups by neutralization after the polyaddition reaction.

The nature of and quantitative ratios between the reactants are selected in such a way that the above-mentioned groups (e) to (h) are present in the polyaddition products according to the present invention in the amounts indicated. Where diisocyanatotoluene is used as the isocyanate component, the urethane content preferably amounts to between about 30 and 34% by weight, the hydroxyl content to between about 0.03 and 0.6% by weight, the ionic group content to between about 10 and 60 milliequivalents per 100 g and the content of tri- or tetra-ethylene oxide units to between about 10 and 35% by weight. Where 2,4'- and 4,4'-diisocyanatodiphenyl methane is used as the isocyanate component, the urethane content preferably amounts to between about 25 and 30% by weight, the hydroxyl content to between about 0.1 and 1.5% by weight, the ionic group content to between about 20 and 80 milliequivalents per 100 g and the content of tri- or tetra-ethylene glycol units to between about 10 and 35% by weight.

Where the preferred diisocyanate components mentioned above are used, the nature of the other starting components and also the quantitative ratios between the reactants are selected in such a way that the products correspond to the above-mentioned data in regard to the composition thereof.

The above-mentioned hydroxyl group content alone shows that an NCO/OH-equivalent ratio of less than about 1:1 is always applied in the production of the polyaddition products. This ratio generally amounts to between about 0.9:1 and 0.995:1, more particularly between about 0.95:1 and 0.99:1.

The production of the polyurethanes according to the present invention is extremely simple and is preferably carried out in the melt. To this end, the synthesis components containing hydroxyl groups are mixed and the diisocyanate added to the resulting mixture either all at once or even in two or more portions at temperatures of from about 10° to 130° C., preferably from about 15° to 80° C. The reaction temperature should not exceed about 210° C.

Where carboxylate and/or sulphonate groups are present, it may be advisable to add small quantities of an acid (for example, from 0.05 to 0.8% by weight, based on the quantity of synthesis component (d)), for example, phosphoric acid, for deactivation. The homogeneously mixed reaction melt may be cast into molds, onto metal plates or onto a belt from about 1 to 2 minutes after the isocyanate has been added, when it is still thinly liquid, and the reaction completed by tempering, although it is also possible, for example, to work continuously in a reaction screw or in a tube and to remove the reaction product in the form of a strand or a viscous melt.

After cooling, the reaction products according to the present invention are hard, tough, transparent or slightly opaque resins which are readily soluble in water at temperatures between about 20° and 95° C. Where the polyurethanes to be dissolved contain free carboxyl and/or sulphonic acid groups a substantially equivalent quantity of alkali, ammonia or an amine should be added to the water. The aqueous polyurethane solution should have a pH of from about 4 to 9 (preferably from about 6 to 8). They may be either genuine solutions or even sols which, after dilution to 5%, for example, are slightly opalescent and show a Tyndall effect.

Drying of a sample of the aqueous solution, for example on sheets of silicon rubber, leaves hard, tough, transparent to slightly opaque films which are highly elastic, i.e., spring back on bending, and are not brittle. They have a smooth, glossy surface and are still soluble in water. Film formation is excellent and there are no signs of any cracks, streaks or craters.

The aqueous solutions do not foam and are free from salts. They are thinly liquid up to a solids content of approximately 25% and do not show any tendency towards hydrolysis, even in the event of prolonged storage at elevated temperature. Accordingly, they may be dialyzed and ultra-filtered, i.e. satisfy all the requirements imposed on a regenerable and, therefore, environmentally acceptable size.

The products according to the present invention may either be dissolved in water by the manufacturer or may be stored as solid products, dispatched to the processor and only then dissolved in water.

By virtue of the range of properties mentioned above, the products according to the present invention are eminently suitable for use as sizes in the textile industry. They coat the fibers with a tough, smooth film and, in this way, make them extremely resistant to mechanical damage. Desizing may be carried out quickly and simply without degradation. The effluents accumulating during desizing may readily be regenerated by ultra-filtration and reused.

The polyurethanes according to the present invention are also suitable for the production of hydrophilic gels. To this end, they are cross-linked with small quantities of polyisocyanates or formaldehyde (derivatives).

Depending on the requirements imposed, the cross-linked polyurethanes or even the uncross-linked polyurethanes may also be used as versatile coating compositions, binders and adhesives, for example, for the production of absorbent non-wovens.

In the following Examples, all the percentages quoted represent percentage by weight.

EXAMPLES

EXAMPLE 1

416 g (4 mols) of neopentyl glycol, 873 g (4.5 mols) of tetraethylene glycol and 645 g (1.5 mols) of the propoxylated sodium salt of 1,4-dihydroxy-2-butane sulphonic acid having a molecular weight of 430 ("sulphonate diol") are mixed and deactivated with 1.2 g of orthophosphoric acid. 1705 g (9.8 mols) of tolylene diisocyanate (80% of 2,4- and 20% of 2,6-isomer) are then added with thorough stirring. On reaching a temperature of from 50° to 70° C., the reaction mixture is poured onto metal sheets where it rapidly hardens with an increase in temperature to 180° C. The mass is tempered for 3 hours at 100° C. and then dissolved in water to form a 15% aqueous solution.
Characteristics of the solid product (calculated):
  Urethane groups: 31.8%
  OH groups: 0.18%
  $SO_3^{(-)}$ groups: 41 m equiv./100 g
  $-(O-CH_2CH_2)_4$ groups: 24%
  Viscosity of the 15% aqueous solution: 3.8 mPas/sec.

EXAMPLE 2

The procedure is as in Example 1, except that 9.9 mols of tolylene diisocyanate are added.
  Urethane groups: 31.9%
  OH groups: 0.09%
  $SO_3^{(-)}$ groups: 41 m equiv./100 g
  $-(O-CH_2CH_2)_4$ groups: 24%
  Viscosity of the 15% aqueous solution: 4.9 mPas/sec.

EXAMPLE 3

The procedure is as in Example 1, except that 9.95 mols of tolylene diisocyanate are added.
  Urethane groups: 32.0%
  OH groups: 0.05%
  $SO_3^{(-)}$ groups: 40 m equiv./100 g
  $-(O-CH_2CH_2)_4$ groups: 24%
  Viscosity of the 15% aqueous solution: 5.0 mPas/sec.

EXAMPLE 4

1275 g (8.5 mols) of triethylene glycol and 645 g (1.5 mols) of "sulphonate diol" are mixed and deactivated with 1.2 g of orthophosphoric acid. 1723 g (9.9 mols) of tolylene diisocyanate (80% of 2,4- and 20% of 2,6-isomer) are then added with thorough stirring. The reaction mixture is poured, at about 80° C., onto metal sheets where it rapidly hardens with an increase in temperature. The mass is tempered for 3 hours at 100° C. and then dissolved in water to form a 15% aqueous solution.
Characteristics of the solid product (calculated):
  Urethane groups: 32.0%
  OH groups: 0.09%
  $SO_3^{(-)}$ groups: 41 m equiv./100 g
  $-(O-CH_2CH_2)_3$ groups: 35%
  Viscosity of the 15% aqueous solution: 3.7 mPas/sec.

EXAMPLE 5

155 g (0.8 mol) of tetraethylene glycol and 26.8 g (0.2 mol) of dimethylol propionic acid are heated to 120° C. until the dimethylol propionic acid has passed into solution, after which the clear solution is cooled to 90° C. 225 g (0.9 mol) of 4,4'-diisocyanatodiphenyl methane are then added. As soon as the reaction mixture has become clear, it is poured out onto a metal sheet and, after hardening, is after-heated for 1.5 hours at 100° C. The hard, tough resin is insoluble in pure water. However, it dissolves in a 5% aqueous solution of dimethyl aminoethanol to form a slightly opaque sol.
Characteristics of the solid product (calculated):
  Urethane groups: 26.1%
  OH groups: 0.84%
  $COO^{(-)}$ groups: 49 m equiv./100 g
  $-(O-CH_2CH_2)_4$ groups: 34.7%

COMPARISON EXAMPLE

The procedure is as in Example 1 using the following components: 900 g (8.5 mols) of diethylene glycol, 645 g (1.5 mols) of "sulphonate diol" and 1705 g (9.8 mols) of tolylene diisocyanate. The product obtained is brittle.
Characteristics:
  Urethane groups: 35.7%
  OH groups: 0.21%
  $SO_3^{(-)}$ groups: 46 m equiv./100 g
  $-(O-CH_2CH_2)_{3-4}$: 0%.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A water-soluble, ultra-filtrable polyurethane anionomer comprising the reaction product of
   (a) organic diisocyanates having molecular weights of from about 160 to 300; with
   (b) tri- and/or tetra-ethylene glycol;
   (c)
     (i) optionally other aliphatic glycols having molecular weights from about 62 to 200;
     (ii) optionally other alcohols with a functionality other than 2; and
   (d) a glycol containing carboxyl, carboxylate, sulphonic acid or sulphonate groups and having a molecular weight below about 500;
in an NCO/OH equivalent ratio of less than about 1:1, any carboxyl or sulphonic acid groups present having been at least partly converted into carboxylate or sulphonate groups after the reaction, characterized by a content of:
   (e) urethane groups, —NH—CO—O—, of from about 25 to 40% by weight;
   (f) hydroxyl groups of from about 0.03 to 1.5% by weight;
   (g) carboxylate groups, —COO—, and/or sulphonate groups, —SO$_3$—, of from about 10 to 80 milliequivalents per 100 g;
   (h) tri- and/or tetra-ethylene glycol units, $-(O-CH_2CH_2)_{3-4}$, chemically incorporated into said polyurethane anionomer, of from about 10 to 40% by weight; and, if component (c) (ii) is present,
   (i) up to about 5 mole % of component (c) (ii) based on the total quantity of components (b), (c) (i) and (d).

2. A process for sizing a textile fabric or fiber comprising treating it with an aqueous solution of a polyurethane anionomer which is the reaction product of
   (a) organic diisocyanates having molecular weights of from about 160 to 300; with
   (b) tri- and/or tetra-ethylene glycol;
   (c)
     (i) optionally other aliphatic glycols having molecular weights from about 62 to 200;
     (ii) optionally other alochols with a functionality other than 2; and
   (d) a glycol containing carboxyl, carboxylate, sulphonic acid or sulphonate groups and having a molecular weight below about 500;

in an NCO/OH equivalent ratio of less than about 1:1, any carboxyl or sulphonic acid groups present having been at least partly converted into carboxylate or sulphonate groups after the reaction, characterised by a content of:
- (e) urethane groups, —NH—CO—O—, of from about 25 to 40% by weight;
- (f) hydroxyl groups of from about 0.03 to 1.5% by weight;
- (g) carboxylate groups, —COO—, and/or sulphonate groups, —SO$_3$—, of from about 10 to 80 milliequivalents per 100 g;
- (h) tri- and/or tetra-ethylene glycol units, —(O—CH$_2$CH$_2$)$_{3\text{-}4}$, chemically incorporated into said polyurethane anionomer, of from about 10 to 40% by weight; and
- (i) up to about 5 mole % of component (c) (ii) based on the total quantity of components (b), (c), (i) and (d).

3. The process of claim 2 including the further step of desizing said textile fabric or fiber and subsequently recovering said polyurethane anionomer by ultra-filtration.

4. The polyurethane anionomer of claim 1 wherein:
- (a) the organic diisocyanate is diisocyanatotoluene;
- (b) the urethane group content is between about 30 and 34 wt.%;
- (c) the hydroxyl group content is between about 0.03 and 0.6 wt.%;
- (d) the ionic group content from carboxylate and/or sulphonate groups is between about 10 and 60 milliequivalents per 100 grams of anionomer; and
- (e) the tri- and tetra-ethylene glycol unit content is between about 10 and 35 wt.%.

5. The polyurethane anionomer of claim 1 wherein:
- (a) the organic diisocyanate is 2,4'- or 4,4'-diisocyanatodiphenyl methane;
- (b) the urethane group content is between about 25 and 30 wt.%;
- (c) the hydroxyl group content is between about 0.1 and 1.5 wt.%;
- (d) the ionic group content from the carboxylate and sulphonate groups is between about 20 and 80 milliequivalents per 100 grams of anionomer; and
- (e) the tri- and tetra-ethylene glycol unit content is between about 20 and 40 wt.%.

6. An aqueous solution of between 10 and 20 wt.% of a polyurethane anionomer which is the reaction product of
- (a) organic diisocyanates having molecular weights of from about 160 to 300; with
- (b) tri- and/or tetra-ethylene glycol;
- (c)
    - (i) optionally other aliphatic glycols having molecular weights from about 62 to 200;
    - (ii) optionally other alcohols with a functionality other than 2; and
- (d) a glycol containing carboxyl, carboxylate, sulphonic acid or sulphonate groups and having a molecular weight below about 500;

in an NCO/OH equivalent ratio of less than about 1:1, any carboxyl or sulphonic acid groups present having been at least partly converted into carboxylate or sulphonate groups after the reaction, characterized by a content of:
- (e) urethane groups, —NH—CO—O—, of from about 25 to 40% by weight;
- (f) hydroxyl groups of from about 0.03 to 1.5% by weight;
- (g) carboxylate groups —COO—, and/or sulphonate groups, —SO$_3$—, of from about 10 to 80 milliequivalents per 100 g; and
- (h) tri- and/or tetra-ethylene glycol units, —(O—CH$_2$CH$_2$)$_{3\text{-}4}$, chemically incorporated into said polyurethane anionomer, of from about 10 to 40% by weight; and
- (i) up to about 5 mole % of component (c) (ii) based on the total quantity of components (b), (c) (i) and (d).

7. A process for the production of a water-soluble polyurethane anionomer comprising:
- (a)
    - (i) mixing tri- and tetra-ethylene glycol,
    - (ii) with glycols containing carboxyl, carboxylate, sulphonic acid or sulphonate groups and having molecular weights below about 500;
    - (iii) optionally with aliphatic glycols having molecular weights between about 62 and 200; and
    - (iv) optionally with other alcohols with a functionality other than 2;
- (b) adding an organic diisocyanate to this mixture at an NCO to OH ratio of between about 0.9:1 and 0.995:1 and at a temperature of between about 10 and 130° C.;
- (c) maintaining the reaction temperature below about 210° C., and
- (d) allowing said reaction product to solidify, wherein the reactants are used in such ratios as to provide:
- (e) a urethane group content of between about 25 and 40 wt. %;
- (f) a hydroxyl group content of between about 0.03 and 1.5 wt. %;
- (g) a tri- and tetra-ethylene glycol unit content of between about 10 and 40 wt. %; and
- (h) a content of said alcohols with functionality other than 2 of up to about 5 mole % based on the total quantity of components (a) (i), (a) (ii) and (a) (iii).

8. A process for the production of an aqueous textile sizing solution comprising dissolving between 10 and 20 wt.% of the polyurethane anionomer of claim 1 in water.

* * * * *